Patented Jan. 23, 1923.

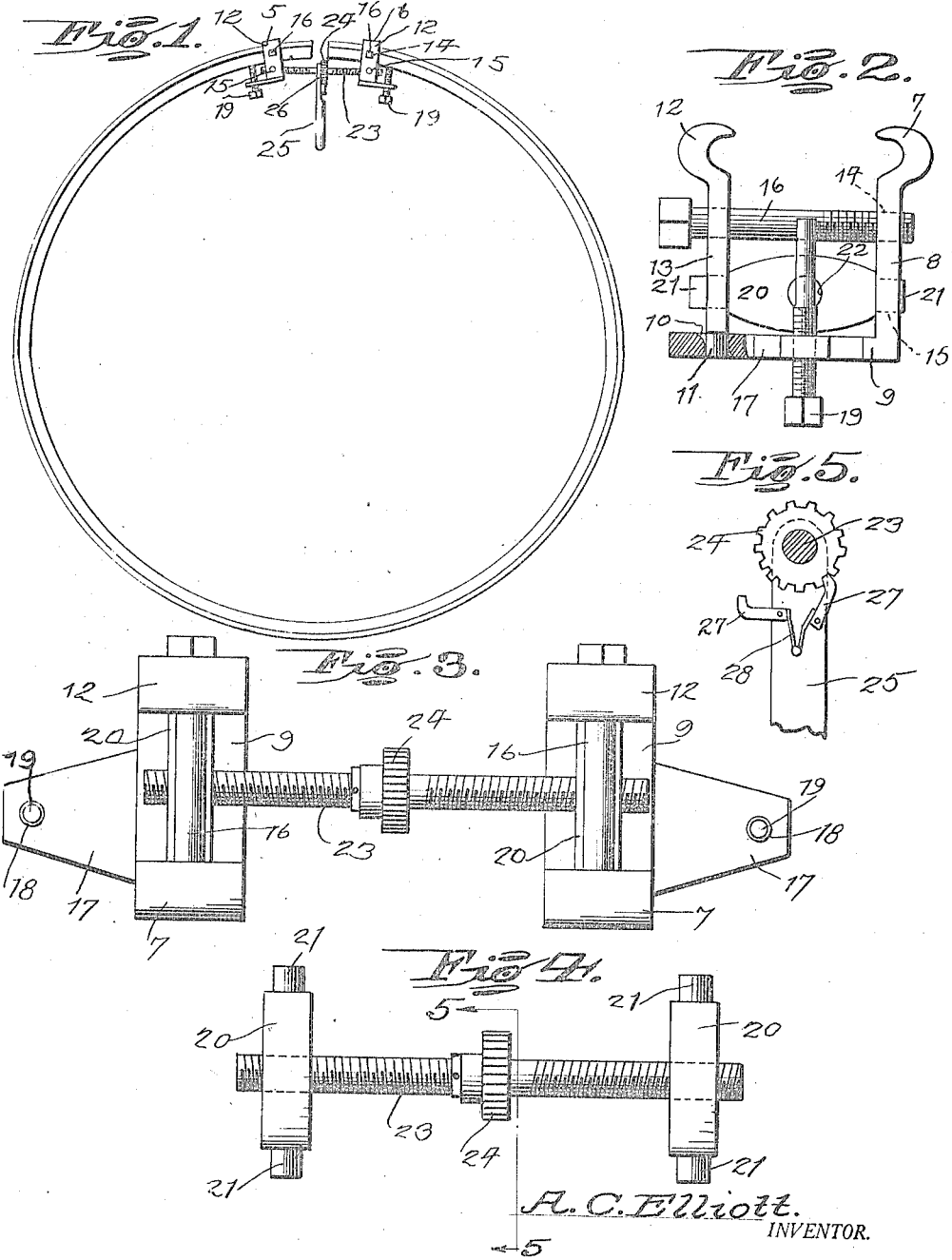

1,443,015

UNITED STATES PATENT OFFICE.

ALLEN C. ELLIOTT, OF RUSSELL, MINNESOTA.

TIRE-RIM TOOL.

Application filed April 2, 1921. Serial No. 457,964.

*To all whom it may concern:*

Be it known that I, ALLEN C. ELLIOTT, a citizen of the United States, residing at Russell, in the county of Lyon and State of Minnesota, have invented certain new and useful Improvements in Tire-Rim Tools, of which the following is a specification, reference being had to the accompanying drawings.

This invention relates to tire rim tools, and has for its object to provide a device of this character capable of being readily applied to the rim to permit easy removal or application of a tire to a rim.

Another object of the invention is to provide a tool of this character comprising a pair of clamping members adapted to engage the tire rim, each clamping member including a movable jaw and means for urging said jaws into binding engagement with the rim.

Another object is to provide a device of this character including a pair of clamping members, the jaws of each clamp serving as supports for a movable connecting member in which an adjusting screw is threaded whereby the clamps may be adjusted toward and away from each other simultaneously to cause expansion and retraction of the rim.

With these and other objects in view, the invention consists in the improved construction and arrangement of parts to be hereinafter more particularly described, fully claimed and illustrated in the accompanying drawings, in which:

Figure 1 is a side elevation of a tire rim showing the invention applied,

Figure 2 is a side elevation of one of the clamps, a portion of the clamp being shown in section, Figure 3 is a top plan view, Figure 4 is a detail view of the adjusted rod and connected members, Figure 5 is a detail view of the lever and ratchet mechanism.

Referring to the drawings, 5 and 6 designate clamps, each clamp consisting of a stationary jaw 7 including a shank 8 and a base plate 9. A relatively large opening 10 is provided in the end of the base plate 9 and is adapted to receive the stem 11 of a movable jaw 12, the stem being smaller in diameter than the diameter of the opening to permit movement of the movable jaw of the plate 9. The shank 13 of the movable jaw and the shank 8 of the stationary jaw are each provided with a pair of openings 14 and 15, the opening 14 of the stationary jaw being threaded. The registering openings 14 are adapted to receive an adjusting screw 16 by means of which the movable jaw is adjusted with respect to the stationary jaw so as to firmly engage the rim A.

The base plate 9 includes an extension 17 having a threaded opening 18 in the end thereof adapted to receive an adjusting screw 19. By means of the screw 19 the jaws of the clamps are urged into binding engagement with the rim so that slipping or movement of the clamps is impossible when the tool is in operation.

A novel connecting member 20 is provided, said member having a trunnion 21 projecting from each end thereof, the trunnions being adapted to extend into the registering openings 15 of the jaws 7 and 12, the connecting member being arranged for pivotal movement between the jaws. The intermediate portion of the connecting member is provided with a threaded opening 22 adapted to receive an adjusting rod 23. One end portion of the rod is provided with left hand threads, while the opposite end portion is provided with right hand threads, the connecting blocks being threaded to correspond. By this means, upon rotation of the adjusting rod 23, the clamps will be moved toward each other through the medium of the connecting members 20. To facilitate this operation, the intermediate portion of the rod 23 is provided with a series of ratchet teeth 24 which extend around the rod. An operating lever 25 is rotatably mounted on the rod closely adjacent the ratchet teeth, the end portions 26 of the lever being reduced. A pair of pawls 27 are pivoted to the reduced end portion of the lever 25 and extend in opposite directions, said pawls being adapted to engage the ratchet teeth. A spring 28 is carried by the reduced end portions and is adapted to engage the pawl to maintain the same in their proper positions, that is, one pawl is disengaged while the other pawl is engaged with the ratchet teeth. The operation of the ratchet is of course obvious.

In the operation of the device, when it is desired to remove a tire, the clamps 6 and 7 are disposed in engagement with the rim adjacent the joint or ends thereof. The screw 16 is then rotated to urge the clamps into engagement with the rim, whereupon the screw 19 is rotated to bind the clamps on the rim, so that movement in any direction and marring of the rim is prevented. The lever 25 is then grasped by the operator to rotate the rod 23. In view of the right and left hand threads of the rod, the clamps 6 and 7 will be moved away from each other so as to separate the ends of the rim a sufficient distance to permit the insertion of a tire iron or screw driver. The rod 23 is then turned in the opposite direction so as to move the clamps toward each other and permit the ends of the rim to lap, thereby decreasing the size of the rim and permitting the tire to be readily removed. It is of course obvious that the clamps will hold the rim in this position indefinitely through the medium of the screws 16 and 19. One of the trunnions 21 is longer than the other to prevent disengagement of the jaw 12 during adjustment.

From the foregoing it will be readily seen that this invention provides a novel form of tire rim tool which does not require any skill or strength to operate. It permits application and removal of a tire in a very short time, and in view of its compact arrangement it may be readily carried in the tool box of an automobile.

What is claimed is:

1. A tire rim tool comprising a pair of clamps, each clamp including a stationary jaw, a movable jaw mounted on the stationary jaw, an extension projecting from the central portion of the base of the stationary jaw, adjusting means carried by said extension and adapted to engage a tire rim, a connecting member having trunnions on its ends, said member being movably mounted between the jaws of the clamp, and having a threaded opening in its central portion, and an adjustable member having its end portions threaded in the openings of the connecting members for simultaneously moving the clamps.

2. A tire rim tool comprising a pair of clamps, each clamp comprising a stationary jaw having one end provided with rim engaging means, the opposite end of said jaw being provided with an extension, said extension extending in angular relation to the stationary jaw and having a flared opening adjacent its extremity, a movable jaw having one end thereof reduced and disposed in the opening of the stationary jaw, bearing members disposed between the jaws of the clamps, each bearing member having trunnions at its end portions adapted to enter openings provided in the jaws of the clamps, one of said trunnions of each bearing member being longer than the opposite trunnion of the bearing member to permit movement of the movable jaw relative to the stationary jaw, without causing disengagement of the bearing member from the jaws, said bearing member having a threaded opening in its central portion, and an adjusting screw having its ends threaded in the openings of the bearing members of the clamps.

In testimony whereof I hereunto affix my signature.

ALLEN C. ELLIOTT.